June 2, 1970          E. McDADE          3,514,900
METHOD FOR RAPIDLY REPRODUCING ORCHIDS
Filed Aug. 11, 1967
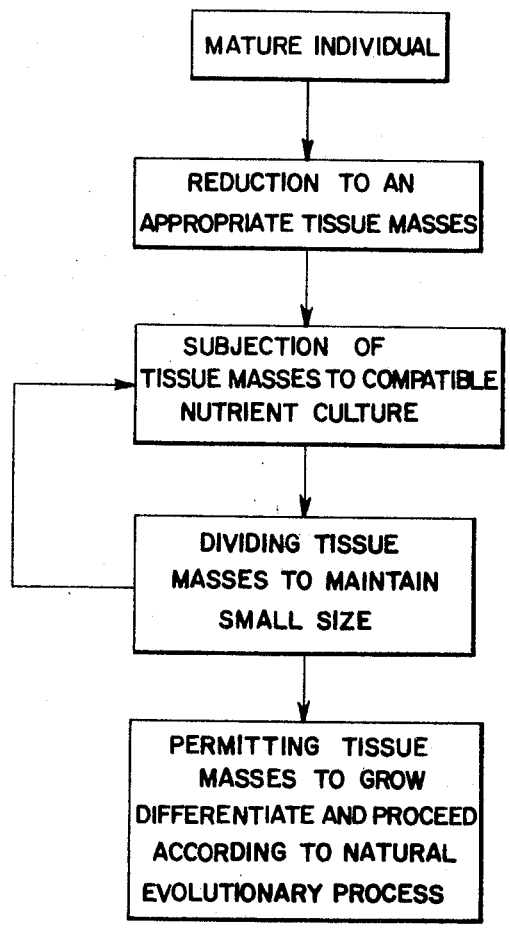
Everest McDade
INVENTOR United States Patent Office 3,514,900
Patented June 2, 1970

3,514,900
METHOD FOR RAPIDLY REPRODUCING ORCHIDS
Everest McDade, 344 Royal Pines Drive,
Skyland, N.C. 28776
Continuation-in-part of application Ser. No. 622,832,
Dec. 27, 1966. This application Aug. 11, 1967, Ser.
No. 672,407
Int. Cl. A01g 31/00
U.S. Cl. 47—58                                4 Claims

ABSTRACT OF THE DISCLOSURE

The steps of reducing a mature plant individual or seedling to an undifferentiated tissue mass, subjecting the tissue mass to a compatible nutrient media under conditions favoring the rapid undifferentiated growth of the tissue mass, dividing the growing undifferentiated tissue mass to provide a plurality of undifferentiated tissue masses of relatively small size, and permitting the plurality of tissue masses obtained from the single tissue mass to grow, differentiate and mature into a plurality of identical plants.

---

This is a continuation-in-part of application Ser. No. 328,723, filed Dec. 6, 1963, now abandoned and application Ser. No. 622,832, filed Dec. 27, 1966, now abandoned.

This invention relates to a method whereby a considerable number of living organisms similar to an original individual organism can be produced from the original in a substantially shorter period of time than possible heretofore. More specifically this invention relates to the unnatural multiplication of an individual organism, in particular a plant, by subjecting a tissue mass obtained from the plant to liquid culture techniques.

Up until the present time, unnatural multiplication has generally been confined to dividing mature plants and to starting plants from pseudobulbs. However, these methods in most instances have been found to consume a very long period of time in order to reproduce a large number of plants identical to the original individual plant organism. On the other hand, the only method heretofore known of producing a larger number of individuals in a short time has been the cultivation of a plurality of seeds from the original plant. This method has been found unsatisfactory since the seeds are normally so heterozygous that there is no assurance that the cultivated individuals obtained from the seeds of the parent plant will be either identical or similar to the parent plant.

A meristem culture method has been proposed heretofore, however, it does not show or suggest the method of the present invention whereby division of an undifferentiated tissue mass obtained from the meristem is utilized to grow additional undifferentiated "clonal" tissue masses so as to produce a clone having a substantially greater number of plants within a similar period of time as would be obtained by carrying forth the prior meristem culture method.

Accordingly, it is the primary object of this invention to multiply an individual plant organism at a much faster rate than would be possible by nature alone.

Another object of this invention is to produce plant individuals having similar characteristics to the original plant individual.

A further object of this invention is to have readily available the means for obtaining a large supply of individual plant organisms by storing over extended periods of time tissue masses representing the embryonic undifferentiated stage of the evolutionary progress of the plant organisms.

A still further aspect of this invention resides in the reproduction of the plant organism at a stage of growth not possible by nature alone.

The above and other objects are secured, in accordance with this invention by reducing an individual plant organism or seedling to a juvenile undifferentiated "embryonic" state (taking that part of the individual which is primitive enough and small enough to represent its basic evolutionary stage where it still contains the necessary hereditary characteristics to grow into a differentiated mature plant), multiplying this juvenile part by liquid culture methods and by controlling the individual organism size and condition so as to temporarily render ineffective the evolutionary process so as to produce a plurality of undifferentiated tissue masses and after sufficient multiplication permitting the evolutionary process to take place whereby the undifferentiated tissue masses differentiate and grow into identical mature plants.

In carrying out the method of this invention for the rapid production of a plurality of plant organisms from and having similar characteristics to a single original individual, it has been found that the following steps are necessary: (1) securing from the plant organism or seed an undifferentiated tissue mass which is capable of producing cells representing an early undifferentiated state of development, which tissue is of a relatively small size, and which has a thin highly permeable skin; (2) subjecting the mass to a compatible nutrient culture; (3) while the part is subjected to the nutrient culture, providing a proper environment, such as temperature and light condition; and (4) performing certain external operations in order to maintain an appropriately small enough tissue mass size. The accompanying illustration is a flow chart of the novel method set forth above.

The above outlined steps are in essence the core of this invention. It is essential that the tissue mass taken from the growing individual or comprising the substantially undifferentiated seedling be capable of producing cells representing the juvenile embryonic stage of development of the individual. It has been found that depending upon the thickness and permeable character of the skin or cell walls, the tissue mass must be of such small size that the surface to mass ratio permits rapid outward diffusion of internal inhibitors and inward diffusion of nutrients. Further, a small mass size is desirable in order to minimize the quantity of internal inhibitors and facilitate rapid reproduction of the cells.

It is intended that conventional liquid nutrient solutions should be adapted for this process. However, since in connection with any particular tissue mass one nutrient will have a greater effect in producing the desired growth characteristics of the mass over others, it is not intended to restrict this invention to a particular nutrient culture or type of culture. In developing the most appropriate nutrient it has been found desirable from an economic standpoint to rely upon the genetic differences between individuals. Therefore, a number of individuals can be subjected to a particular nutrient in order to find one which suits that nutrient. Once even the slightest multiplication is achieved, experimentation can be made with the nutrient to adapt it to suit the individual tissue mass.

The temperature of the nutrient culture should be maintained near the temperature which the tissue mass is normally accustomed to while within the individual from which it was excised. The light intensity should be maintained at a low value, something less than 100 foot candles for plant tissue masses, in order to discourage normal progress of the tissue mass from the stage of absorption of food directly through the skin or cell wall to a photosynthetic stage wherein the tissue manufactures internally many compounds necessary for its differentiation and growth. Further, the nutrient should have good diffusion characteristics so as to allow a high rate of diffusion through the thin skin or cell wall of the tissue mass by a thermally induced convection of the nutrient. The high rate of diffusion and convection can be obtained in connection with a nutrient solution by gently agitating the flask containing the nutrient solution and tissue mass.

Of prime importance is the necessity to maintain the tissue mass small enough to insure that shoot formation and differentiation does not occur. This is necessary because once the mass becomes too large and the ratio of surface area to mass passes a certain range, inward diffusion of nutrients and outward diffusion of internal inhibitors is hindered such that the tissue either differentiates or dies. This maintenance of the size of the tissue mass is obtained by periodically breaking or cutting into segments the tissue mass, which has grown and proliferated thereon new tissue masses. These segments which are now cells representing the early state of development can then be subjected to fresh nutrient. By thus controlling the size of the tissue mass the evolutionary progress of the tissue mass which would normally occur in nature is temporarily rendered ineffective.

With the foregoing presentation in mind, there are given hereinafter several selected detailed examples of reductions to practice of the invention in order that a more complete understanding of the invention may be more readily had.

Up until the present time orchids, for example, have been generally grown from hybrid seed or obtained by division of mature plants. The natural rate of increase of a mature plant is about 40%, weight per year. At present, small plants are generally all seedlings which are homozygous for some of the more readily observable characteristics but often possess uncertain flowering characteristics, while mature plants bearing fine flowers divide so slowly that by the time any substantial number could be produced, the plants would be eclipsed in quality by selected plants from more recent generations of hybrids.

Example I.—Plant Identification: Cattleya Bow Bells, plant No. 108–7, variety Edith McDade.

A normal plant, one-quarter inch high growing in an Erlenmeyer flask on ordinary sterile agar, was placed in a darkened incubator at 87° F. for a period of 35 days during which it became etiolated, vine-like and leafless, growing new nodes at intervals of 11 days. The colorless stem was less than ½ mm. in diameter and the nodes about 5 mm. apart. Three nodes were removed from the etiolated plantlet, aseptically cut from one another with sterile surgical scissors, and placed in a liquid sterile nutrient solution. This solution comprised 2 grams stock nutrients (see below), 1 cc. trace mineral stock solution (see below) and 20 grams sucrose to 1 liter of water. The pH was adjusted to 4.9 with hydrochloric acid (HCl) and the solution was autoclaved for 15 minutes at 15 p.s.i. pressure.

Stock nutrients:                                          Grs.
    Calcium nitrate—$Ca(NO_3)_2$ ------------------ 100
    Potassium dihydrogenphosphate—$KH_2PO_4$ ---- 25
    Magnesium sulfate—$MgSO_4 \cdot 7H_2O$ ---------- 25
    Ammonium sulfate—$(NH_4)_2SO_4$ ------------ 50
    Ferric phosphate—$FePO_4$ ------------------ 5

Total ---------------------------------- 205

Trace mineral stock solution:                             Grs.
    Boric acid—$H_3BO_3$ ----------------------- 2.0
    Manganese chloride—$MnCl_2 \cdot 4H_2O$ ---------- 2.0
    Zinc sulfate—$ZnSO_4 \cdot 7H_2O$ ---------------- 0.3
    Copper sulfate—$CuSO_4 \cdot 5H_2O$ -------------- 0.02
    Water—$H_2O$ sufficient to make one 1 liter of solution.

Since the nodes were small enough and primitive enough and the cell wall thickness permeable enough, it was not necessary to reduce their size any further and the nodes did not progress according to evolutionary principles but grew into clusters of protocorm-like tissue masses. When placed in the nutrient solution, the nodes weighed about 5 micrograms and has a surface to mass ratio of approximately 300 cm.$^2$ per gram. In a little over one year the nodes grew to ball-like masses of tissue approximately ¼ inch in diameter. As such, the tissue masses had a surface to mass ratio of only 10 cm.$^2$ per gram. Some clusters were cut into sections and placed into fresh liquid sterile nutrient solution. Other clusters were cut up and planted on normal agar media. The liquid sterile nutrient solutions were maintained at a temperature ranging from 40° F. to 85° F. and were subject to low light level, about 30 foot candles. The absence of the solidifying agar from the liquid nutrient solutions allowed the necessary high rate of diffusion of nutrients and inhibitors through the thin skin of the tissue masses. It has been found that the tissue in the nutrient solution doubles in useful weight approximately every 30 days. Once planted on normal agar culture, a tissue mass begins to differentiate and within approximately four years the individual plant flowers.

The history in this particular example is as follows: Within two years from a single meristem there were seven flasks of seedlings on normal agar, three test tubes of tissue masses stored in nutrient solutions, and five plants in small flower pots. The first plant flowered after almost six years and after twelve years 400 flowering plants exist having characteristics identical to the original individual from which the single meristem was obtained.

Example II.—Plant identification: Cattleya affection (orchids) Seed #103 clone #3.

Since it has been found that orchid seeds actually are capable of producing cells representing an early state of undifferentiated development and are of a small size having a highly permeable skin, it is not necessary to reduce the seed size, i.e. excise a portion in order to carry out the concept of this invention. About 1000 seeds were placed in a flask containing 170 cc. of sterile nutrient solution similar to that used in Example I. After a six month period some of the seeds had died and others had reacted variously, many having grown into pea-sized balls of undifferentiated tissue masses. Five of the largest balls were selected because of their apparent ability to grow without differentiation in the selected nutrient solution. One of the balls of undifferentiated tissue, identified as #103 was cut into small pieces and placed in a new flask of nutrient solution. After another nine month period, the resulting clonal tissue masses were again cut up and used to plant two flasks of clonal tissue masses in nutrient solution and two flasks of clonal tissue masses on normal agar. After a further seven month period, the clonal tissue masses in the two flasks of nutrient solution were cut up and planted on agar. After two years and seven months from the seed planting, the clone produced from the original undifferentiated tissue mass consisted of a few plants in flower pots, thirteen flasks of agar each containing thirty or more plantlets and two flasks of nutrient solution each containing about twenty clonal tissue masses. Eight years after planting, the clone #103 consisted of several hundred flowering size plants.

Example III.—Plant identification: Sophrolaeliocattleya orchids Seed #277 clones #1 through #18 (lc. Joseph Hampton F.C.O.× Lc. Radians, var. Bonycrest).

These plants were obtained from a commercial grower. As received they were small six month old plantlets on agar in sterile culture tubes. It was observed that the plantlets were exceptionally spindly, thin leaved and small, apparently due to etiolation. The plantlets were placed in a sterile nutrient solution similar to that used in the above examples. Most of the plants died, but some developed into pea-sized balls of tissue masses after a period of approximately four months. Eighteen of the most vigorous balls were selected, and each was cut up into small pieces and placed again in flasks of sterile nutrient solution. After a period of four more months, clone #11 consisted of four flasks of tissue masses in sterile nutrient solution and twelve flasks of tissue masses planted on agar, some of which masses were growing into plantlets. After a period of thirty months, nine flasks containing normal agar contained about 100 inch-high plants of clone #11.

Example IV.—Plant identification: Sophrolaelicattleya hybrid named "Variation," Seed #241 clone #3.

1000 seeds were placed in a sterile nutrient solution similar to that utilized in the above examples. After approximately a three month period some of the seeds had died and others had reacted variously, a few having grown into pea-sized balls of tissue masses. Twenty of the largest balls were selected because of their ability to grow without differentiation in the nutrient solution. One of the balls, identified as cross #241 was cut into small pieces which were put on the surface of an agar culture medium contained in three flasks. The agar culture medium is prepared in a similar manner and is identical to the sterile nutrient solution except that approximately two grams of agar were added to 170 cc. of the nutrient solution and the autoclaving time was varied slightly as required to decompose the agar to a soft consistency strong enough to support the tissue on its surface but sticky enough to act as an adhesive to hold the tissue in contact. After a period of four months, the clonal tissue masses had grown into plantlets, one of which was transplanted into a flower pot filled with a conventional growing media of silica-sand and Osmunda-root-fibre. Twenty smaller plants in the three flasks were not yet large enough for transplanting. However, not all of the tissue masses differentiated, but were proliferating as tissue masses. Accordingly within the same culture medium, tissue masses were both differentiating and reproducing cells representing the evolutionary state of development.

Example V.—Plant identification: Laeliocattleya #105 clones #1 through #27.

Twenty-seven "clones" were established from undifferentiated tissue i.e. meristem, and placed in sterile nutrient solution similar to that utilized in the above examples. Clone 105-5 because of its ability to "ball easily," i.e. forms balls of undifferentiated tissue mass was selected to be proliferated in great quantities. Several thousand plants of clone 105-5 were grown.

Example VI.—Plant identification: *Pinus strobus*.

A meristem aseptically excised from the bud of a *Pinus strobus* was placed in a sterile aqueous nutrient solution as disclosed hereinabove and after about 10 days under undifferentiated growth promoting conditions as set forth above the meristem showed the development of 4 "buds" which undifferentiated growth was then divided and aseptically transferred to separate nutrient solution containing tubes where it was observed that the buds were normally differentiated in every respect as determined by low power microscopic observation.

Example VII.—Plant identification: Carnation (var. Pink Sims).

Nine aseptically excised apical meristems of Pink Sims were cultured in sterile aqueous nutrient media as set forth hereinabove in such a manner so as to promote their undifferentiated growth. They exhibited a growth rate of about 3.5% per day. The plantlets were examined by low power stereo-microscope through the culture tube wall and were observed to be maturing normally as compared with the plants from which they were derived.

Example VIII.—Plant identification: Carrot (var. unknown).

A meristem aseptically excised from the carrot was cultured in the manner disclosed hereinabove and after about 14 days had developed into a cluster of undifferentiated "buds" showing a growth rate of about 11% per day which under subsequent low power stereo-microscopic examination were observed to be maturing, i.e. differentiating, normally as compared with the carrot from which it was derived.

Example IX.—Plant identification: Mint.

The method of the present invention was carried forth by aseptically excising an apical meristem which was placed in an aqueous nutrient solution, such as set forth in claim 1. The meristem was observed to multiply, and after division, by cutting, at least one undifferentiated bud was observed to grow into a differentiated plant.

Example X.—Plant identification: Lettuce (var. unknown).

Three meristems aseptically excised from leaf axils of the lettuce were placed in aqueous nutrient solution as set forth in Example I. After about 14 days two of the cultures had grown undifferentiated tissue masses comprising a plurality or cluster of "buds." The cluster of buds grew into a cluster of plantlets which, under low power stereo-microscopic examination appeared normal in differentiation and growth.

Example XI.—Seed identification: Petunia (var. Burpee #4202).

A plurality of seeds which has been submerged in chlorinated water for about 45 minutes to "sterilize" their surfaces were aseptically cultured in an aqueous nutrient solution and on moist agar. A number of seeds from both the liquid culture and moist areas on the agar, where seeds were sumberged, developed undifferentiated tissue masses. The roots appeared normal and no abnormality of the plantlets was observed.

Example XII.—Plant identification: White potato (var. unknown).

Five meristems were aseptically excised from the "eyes" or buds of the potato and placed in an aqueous nutrient solution such as set forth in Example I. After about 45 days the meristems were observed to have increased in size and developed numerous undifferentiated growing points. The many growing points observed by low power microscopic examination were characteristic of the normally developing potato plant from which they were derived.

Example XIII.—Plant identification: Onion (var. unknown).

A meristem aseptically excised from the onion was cultured in sterile aqueous nutrient solution, such as set forth in Example I, and about 15 days later it was observed that the meristem had grown to form an undifferentiated tissue mass or "cluster." The cluster was observed to form many growing points which appear to be those of a normally developing onion plant.

From the foregoing it will be appreciated that it has been discovered that it is possible to reduce a differentiated plant or seedling down to a generally undifferentiated stage which is homologous to a large mass of protocorm tissue grown from a seed, and that such a "protocorm" may be subdivided before it has further differentiated so as to permit rapidly producing a plurality of identical plant organisms in a substantially shorter period of time than possible heretofore.

What is claimed as new is as follows:

1. The method of asexual multiplication of an individual plant selected from the orchid family which comprises the steps of:
   (a) etiolating said individual plant;
   (b) removing from said etiolated individual plant at least one nodal tissue mass;
   (c) placing said at least one nodal tissue mass in a compatible nutrient media;
   (d) subjecting said at least one nodal tissue mass to temperature and light conditions which permits growth and discourages normal progress of said at least one tissue mass from the stage of absorption of food directly from the nutrient media to a photosynthetic stage;
   (e) dividing said growing tissue mass into smaller masses, the maximum size of each division being sufficiently small that inward diffusion of nutrients and outward diffusion of inhibitors is not hindered;

(f) repeating the culturing of the smaller masses, as set forth in steps (c), (d), and (e), with regard to said least one nodal tissue mass to achieve a selected number of divisions; and (g) periodically adjusting the environment of a selected number of said divisions whereby said divisions differentiate and produce a number of plant individuals similar to said individual plant.

2. The method of claim 1 wherein said nutrient media is maintained at a temperature between 40° F. and 85° F. and is subjected to a light intensity of about 30 foot candles.

3. The method of claim 1 wherein the nutrient media comprises: 20 grams sucrose; 2 grams of the mixture comprising 100 grams calcium nitrate, 25 grams potassium dihydrogenphosphate, 25 grams magnesium sulfate, 50 grams ammonium sulfate, and 5 grams ferric phosphate; 1 cc. of the solution comprising 2 grams boric acid, 2 grams manganese chloride, 0.3 gram zinc sulfate, 0.02 gram copper sulfate, and sufficient water to make 1 liter of solution; sufficient water to make 1 liter of said liquid nutrient media; and sufficient hydrochloric acid to adjust the pH of the 1 liter of liquid nutrient media to 4.9.

4. The method of producing a large number of individuals similar to an individual plant selected from the orchid family which comprises the steps of:

(a) securing from said individual plant a tissue mass capable of reproducing cells representing the juvenile embryonic stage of said individual plant;

(b) placing said tissue mass in a compatible nutrient solution until said mass grows and proliferates;

(c) maintaining the tissue mass particle size less than approximately one-quarter inch in diameter by periodically dividing said tissue mass into smaller masses so that the maximum size of each division is sufficiently small that inward diffusion of nutrients and outward diffusion of inhibitors is not hindered;

(d) placing said smaller tissue masses into fresh nutrient solution;

(e) repeating the culturing of said smaller tissue masses, as set forth in steps (b) and (c), with regard to said tissue mass to achieve a selected number of divisions; and (f) adjusting the environment of a selected number of said smaller tissue masses whereby they differentiate and grow into plant individuals similar to said individual plant.

References Cited

Morel et al., Report of 14th Intl. Hort. Congress, 1955, page 10 (translation) relied on.

Morel, American Orchid Soc. Bull., July 1960, pp. 495–497 relied on.

Kohl, American Orchid Soc. Bull., February 1962, pp. 117–120 relied on.

Wimber, American Orchid Soc. Bull., February 1963, pp. 105–107 relied on.

ROBERT E. BAGWILL, Primary Examiner